3,258,459
METHOD FOR THE PREPARATION OF N-MONO-SUBSTITUTED-SECONDARY AMINOALKYL DERIVATIVES OF POLYCYCLIC COMPOUNDS
Harry L. Yale, New Brunswick, and Francis A. Sowinski, Edison, N.J., assignors, by mesne assignments, to E. R. Squibb & Sons, Inc., New York, N.Y., a corporation of Delaware
No Drawing. Filed Aug. 30, 1962, Ser. No. 220,537
5 Claims. (Cl. 260—243)

This application is a continuation-in-part of application Serial No. 193,316, filed May 8, 1962, now U.S. Patent 3,188,320, which is in turn a continuation-in-part of application Serial No. 86,003, filed Jan. 31, 1961, now abandoned.

This invention relates to a method for the preparation of monosubstituted aminoalkyl derivatives, i.e., wherein but one of the hydrogens on the nitrogen atom is replaced, of polycyclic compounds. More particularly, the invention relates to a method for the introduction of monoalkylaminoalkyl, monoaralkylaminoalkyl or monoarylaminoalkyl substituent into a polycylic nucleus. Monosubstituted aminoalkyl groups cannot be introduced into polycyclic nuclei as readily as disubstituted aminoalkyl substituents. Known methods involve considerable difficulty since severe conditions are required, e.g. boiling mineral acids, which induce competing reactions and severely reduce the yield. The present method is particularly useful because the conditions are mild.

According to this method, the polycyclic compound to which it is desired to attach the monosubstituted aminoalkyl group is first treated with an N-aralkyl-N-R-aminoalkyl halide, in which R is the desired alkyl, aralkyl or aryl substituent group, to obtain the N-aralkyl-N-R-amino-alkylene derivative. The latter is treated with an aralkyl haloformate or alkyl haloformate (in which the halogen is preferably chlorine or bromine) to convert the substituent to the N-R-alkylcarbamic acid aralkyl or alkyl ester group. The ester group is then removed, for example with a hydrogen halide such as hydrogen chloride, hydrogen bromide or the like in a liquid organic acid, e.g. a lower fatty acid such as acetic acid, propionic acid, etc. to leave the desired monosubstituted aminoalkyl group attached to the polycyclic nucleus.

The method of this invention may be applied to a wide variety of polycyclic nuclei. These include polycyclic carbocyclic nuclei containing two or three fused rings or heterocyclics including one or more atoms other than carbon, e.g. nitrogen, sulfur, oxygen, boron, phosphorus, and the like, in two or more fused ring systems, having up to about 18 atoms. This method may be applied to compounds already containing other substituents attached to the nucleus, e.g. halogens, hydrocarbon groups such as alkyl, aryl, and aralkyl groups, trihaloalkyl groups such as trifluoromethyl, trichloromethyl, ether groups such as alkoxy, aralkoxy groups and the like, etc. but obviously one ring position must remain open. The method of this invention is particularly valuable for the addition of a monsubstituted aminoalkyl group to a ring nitrogen atom which possesses a hydrogen atom, e.g. >N—H in a polycyclic nitrogen heterocyclic and this constitutes a preferred aspect of the invention.

Illustrative of polycyclic nuclei to which the method of this invention may be applied (and which nuclei may be otherwise substituted as indicated above) include the following: benzazepine, benzathiozepine, dibenzothiazepine, phenothiazine, benzazocine, dibenzothiazothiazocine, dibenzazocine, dibenzocycloheptene, dibenzooxaborocine, and dibenzoxazaphosphocine (and their hydrogenated congeners), etc.

The side chain introduced by the method of this invention answers to the formula R—NH-alkylene- The alkylene group may be a straight or branched chain saturated aliphatic hydrocarbon group of any length such as methylene, ethylene, tetramethylene, octamethylene, 2-methyltrimethylene, 2-methylethylene, but lower alkylene groups constitute a preferred class.

The symbol R represents alkyl, aralkyl or aryl groups. The alkyl groups are hydrocarbon chains of the same character as the alkylene groups already described and lower alkyl group such as methyl, ethyl, propyl, isopropyl, butyl, isobutyl, t-butyl, etc. are preferred.

Aryl groups represented by R include carbocyclic aromatic groups up to 12 carbon atoms, particularly phenyl and phenyl groups containing one or more (e.g. up to about four) substituents such as halogens, lower alkyl, lower alkoxy, nitro, amino, trifluoromethyl, trifluoromethylmercapto, etc. (which may be alike or different). Thus groups such as the following are contemplated: phenyl, tolyl, xylyl, cresyl, chlorophenyl, dichlorophenyl, bromophenyl, dibromophenyl, iodophenyl, trichlorophenyl, tetraiodophenyl, nitrophenyl, aminophenyl, trifluoromethylphenyl, trifluoromethylmercaptophenyl, trifluoromethoxyphenyl, etc.

The aralkyl substituents represented by R are carbocyclic groups including alkl groups of the character described previously to which are attached aryl groups such as those described in the preceding paragraph, e.g. containing up to about 15 carbon atoms altogether. Phenyl-lower alkyl groups, such as benzyl and phenethyl are preferred.

The series of reactions, using the addition of an alkyl-amino alkylene chain into a phenothiazine nucleus as an example, may be illustrated as follows:

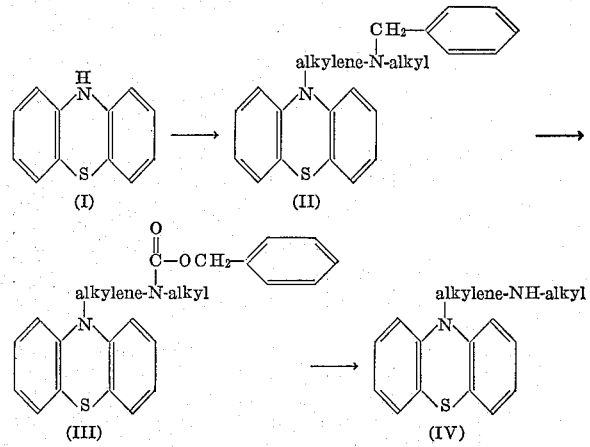

The first step of the process, in which the polycyclic nuclear compound reacts with the N-substituted-N-aralkylaminoalkyl halide is advantageously carried out in an inert organic solvent, e.g. an aromatic hydrocarbon such as benzene, toluene, xylene or the like, or in a cyclic ether like tetrahydrofuran in the presence of about one equivalent of sodamide or sodium hydride. Heating, e.g. up to about reflux temperature, facilitates the reaction. The reaction product may be separated by conventional means and purified or may be used in the crude form in the subsequent steps of the procedure.

The formation of the carbamic acid ester by reaction of the above reaction product with a haloformate such as a chloroformate is effected in an inert organic solvent, e.g. benzene, toluene, xylene or the like, with heating up to about reflux temperature.

The final step for removal of the ester group utilizes a concentrated solution of hydrogen halide, e.g. hydrogen chloride, hydrogen bromide and the like, in an inert organic solvent such as diethylene glycol, dimethyl ether, diethyl ether, tetrahydrofuran and the like but preferably a liquid organic acid such as a lower fatty acid like acetic, propionic, or butyric acid is used.

Although the presence of some water is not excluded, best results in all steps of the process are obtained under anhydrous conditions.

The method of this invention is useful for the production of a wide variety of aminoalkyl substituted products which have many uses, notably in the field of therapeutic agents, e.g. antihistamines, ataractic agents, central stimulants, cardiovascular agents and the like.

The following examples are illustrative of the invention. All temperatures are expressed on the centigrade scale.

EXAMPLE 1

*Preparation of N-(3-chloropropyl)-N-methylbenzylamine*

(A) To a cooled, stirred solution of 72.6 g. of N-methylbenzylamine, in benzene, are added dropwise 37.1 g. of 3-chloropropionyl chloride and the mixture is heated under reflux for 5 hours, cooled, filtered, the filtrate concentrated, and the residue distilled to give 41.3 g. of N-benzyl-3-chloro-N-methylpropionamide, B.P. 132–135° (0.6 mm.), $n_D^{26}$ 1.5418. A solution of 20.0 g. of the amide in 200 ml. of anhydrous ether is added dropwise to a stirred suspension of 3.8 g. of lithium aluminum hydride in 200 ml. of anhydrous ether and the mixture heated under reflux for 1 hour, cooled, treated with 2.5 ml. of water and 2.5 ml. of 20% aqueous sodium hydroxide, filtered, the filtrate dried, concentrated, and the residue distilled to give 13.8 g. of N-(3-chloropropyl)-N-methylbenzylamine, B.P. 89–91° (1 mm.), $n_D^{25}$ 1.5145.

(B) A stirred mixture of 85 g. of N-methylbenzylamine, 31.2 g. of sodamide, and 1 l. of toluene is heated under reflux for 1 hour, cooled, 134 g. of 1-bromo-3-chloropropane added dropwise and heating under reflux continued for 16 hours. The reaction mixture is then filtered and fractionally distilled to give 38 g. of N-(3-chloropropyl)-N-methylbenzylamine.

EXAMPLE 2

*Preparation of 8-chloro-10,11-dihydro-10-(3-methylaminopropyl)dibenzo[b,f][1,4]thiazepine*

(A) A mixture of 13.0 g. of 8-chloro-10,11-dihydrodibenzo[b,f][1,4]thiazepine, 2.5 g. of sodamide, and 250 ml. of dry xylene is heated under reflux for 3 hours, cooled, 12.8 g. of N-(3-chloropropyl)-N-methylbenzylamine added, dropwise, and heating under reflux continued for 10 hours. The reaction mixture is filtered, extracted with 250 ml. of 5% HCl, the acid extract made alkaline, extracted with ether, the ether extract dried, concentrated, and the residue distilled to give 13.8 g. of 10-[3-(benzylmethylamino)propyl]-8-chloro-10,11-dihydrodibenzo[b,f][1,4]thiazepine, B.P. 247–259° (0.2 mm.). The salt of this base with one mole of oxalic acid has a M.P. of 138–139°.

(B) A solution of 4.1 g. of 10-[3-(benzylmethylamino)propyl] - 8 - chloro - 10,11 - dihydrodibenzo[b,f][1,4]thiazepine and 2.6 g. of benzylchloroformate in 50 ml. of dry benzene is heated under reflux for 16 hours, cooled, extracted with 100 ml. of 5% hydrochloric acid, washed with water, dried, and concentrated in vacuo to give 3.9 g. of [(8 - chloro - 10,11 - dihydrodibenzo[b,f][1,4]thiazepin - 10 - yl)propyl]methylcarbamic acid, benzyl ester as a viscous oil. To a solution of 3.0 g. of [(8-chloro - 10,11 - dihydrodibenzo[b,f][1,4]thiazepin - 10-yl)propyl]methylcarbamic acid, benzyl ester, in 15 ml. of glacial acetic acid are added 15 ml. of a 30% solution of hydrobromic acid in glacial acetic acid and the mixture kept at room temperature for 3 hours. The product is then precipitated with 100 ml. of anhydrous ether and recrystallized from a mixture of absolute alcohol and anhydrous ether to give 1.1 g. of 8-chloro-10,11-dihydro-10-(3 - methylaminopropyl)dibenzo[b,f][1,4]thiazepine, dihydrobromide, M.P. 174–175° (dec.). The base, obtained by treatment of this dihydrobromide with aqueous sodium hydroxide, distills at 196–198° (0.2 mm). The base in acetone, treated with an acetone solution of oxalic acid, gives the oxalate, M.P. 204–205° (dec.).

(C) By replacing the benzyl chloroformate in Example 2, Section (B) with 2.2 g. of ethyl chloroformate there is obtained by a similar procedure 3.9 g. of [(8-chloro - 10,11 - dihydrodibenzo[b,f][1,4]thiazepin - 10-yl)propyl]methylcarbamic acid, ethyl ester.

(D) To a solution of 6.0 g. of the [(8-chloro-10,11-dihydrodibenzo[b,f][1,4]thiazepin - 10 - yl)propyl]methylcarbamic acid, ethyl ester, in 5 ml. of glacial acetic acid are added 30 ml. of a 30% solution of hydrobromic acid in glacial acetic acid. The mixture is allowed to stand at 20–25° for 48 hours, and after work up as above in Section (B) gives 5.0 g. of 8 - chloro - 10,11 - dihydro - 10-(3 - methylaminopropyl)dibenzo[b,f][1,4]thiazepine, dihydrobromide.

EXAMPLE 3

*Preparation of 8-chloro-10-(3-benzylaminopropyl)-10,11-dihydrodibenzo[b,f][1,4]thiazepine*

(A) Following the procedure of W. S. Gump and E. J. Nikawitz described in Example 1 of U.S. Patent No. 2,504,977 but replacing the monoethanolamine with 751 g. of monopropanolamine there is obtained 775 g. of 3-dibenzylamino-1-propanol, B.P. 146–149° (0.1 mm.), $n_D^{23}$ 1.5622. A solution of 508 g. of this material in 500 ml. of chloroform is treated with a solution of 276 g. of thionyl chloride in 300 ml. of chloroform to give N-(3-chloropropyl)dibenzylamine hydrochloride, M.P. 130–131°. Following the procedure disclosed in Example 2 (A) but substituting for N-(3-chloropropyl)-N-methylbenzylamine 17.8 g. of N-(3-chloropropyl)dibenzylamine there is obtained 16.4 g. of 8-chloro-10-(3-dibenzylaminopropyl)-10,11-dihydrodibenzo[b,f][1,4]thiazepine.

(B) Replacing the 10 - [3 - (benzylmethylamino)propyl] - 8 - chloro - 10,11 - dihydrodibenzo[b,f][1,4]thiazepine in Example 2 (B), by 4.9 g. of 8-chloro-10-(3-dibenzylaminopropyl) - 10,11 - dihydrodibenzo[b,f][1,4]thiazepine and following the procedure described in Section (B) there is obtained 10-(3-benzylaminopropyl)-8-chloro-10,11-dihydrodibenzo[b,f][1,4]thiazepine, dihydrobromide.

(C) Similarly, replacing the 10 - [3 - (benzylmethylamino)propyl] - 8 - chloro - 10,11 - dihydrodibenzo[b,f][1,4]thiazepine in Example 2(B) by 4.9 g. of 8-chloro - 10 - (3 - dibenzylaminopropyl) - 10,11 - dihydrodibenzo[b,f][1,4]thiazepine and replacing the benzyl chloroformate by 2.2 g. of ethyl chlorofromate there is obtained by following the procedure described in Section (B) 8 - chloro - 10 - (3 - benzylaminopropyl) - 10,11-dihydrodibenzo[b,f][1,4]thiazepine, dihydrobromide.

EXAMPLE 4

*Preparation of 10-(3-methylpropyl-8-trifluoromethyl)-10,11-dihydrodibenzo[b,f][1,4]thiazepine*

(A) By replacing the 13.0 g. of 8 - chloro - 10,11 - dihydrodibenzo[b,f][1,4]thiazepine in Example 2(A) with 14.0 g. of 8 - (trifluoromethyl) - 10,11 - dihydrodibenzo[b,f][1,4]thiazepine, there is obtained 10 - [3 - (benzylmethylamino)propyl] - 8 - (trifluoromethyl) - 10,11 - dihydrodibenzo[b,f][1,4]thiazepine.

(B) By replacing the 4.1 g. of 10-[3-(benzylmethylamino)propyl] - 8 - chloro - 10,11 - dihydrodibenzo[b,f][1,4]thiazepine in Example 2(B) with 4.25 g. of the product from (A) above, there is obtained first, {[8-(trifluoromethyl) - 10,11 - dihydrodibenzo[b,f][1,4]thiazepin - 10 - yl]propyl}methylcarbamic acid, benzyl ester, and this latter product, treated with 15 ml. of a 30% solution of hydrobromic acid in glacial acetic acid gives 10-(3 - methylaminopropyl) - 8 - (trifluoromethyl) - 10,11-dihydrodibenzo[b,f][1,4]thiazepine, dihydrobromide.

EXAMPLE 5

*Preparation of 10-(3-methylaminopropyl)-2-(trifluoromethyl)phenothiazine, hydrochloride*

(A) By replacing the 13.0 g. of 8-chloro-10,11-dihydrodibenzo[b,f][1,4]thiazepine in Example 2(A) with 14.0 g. of 2-(trifluoromethyl)phenothiazine, there is obtained 10 - [3-(benzylmethylamino)propyl]-2-(trifluoromethyl) phenothiazine.

(B) By replacing the 4.1 g. of 10-[3-(benzylmethylamino)propyl] - 8 - chloro - 10,11-dihydrodibenzo[b,f] [1,4]thiazepine in Example 2(B) with 4.15 g. of the product from (A) above, there is obtained first {[2-(trifluoromethyl)phenothiazin-10-yl)propyl]}methylcarbamic acid, benzyl ester, and this latter product, treated with 15 ml. of a 30% solution of hydrobromic acid in glacial acetic acid gives 10-(3-methylaminopropyl)-2-(trifluoromethyl) phenothiazine, hydrobromide. The hydrobromide is dissolved in 25 ml. of water, the solution is treated with 10 ml. of 20% aqueous sodium hydroxide solution and the oil which separates is extracted into ether. The ether solution is carefully dried, clarified by filtration and the filtrate treated with ethereal hydrogen chloride until no further precipitation occurs to give 10-(3-methylaminopropyl)-2-(trifluoromethyl)phenothiazine, hydrochloride, M.P. 129–130°.

The base liberated from the hydrobromide or hydrochloride distills at 163–166° (0.5 mm.).

EXAMPLE 6

*Preparation of 11,12-dihydro-12(3-methylaminopropyl)-6H-dibenzo[b,f][1,4]thiazocine, salt with one mole of maleic acid*

(A) By replacing the 13.0 g. of 8-chloro-10,11-dihydrodibenzo[b,f][1,4]thiazepine in Example 2(A) with 14.0 g. of 6H-dibenzo[b,f][1,4]thiazocine, there is obtained 11,12 - dihydro-12-[3-(benzylmethylamino)propyl]-6H-dibenzo[b,f][1,4]thiazocine.

(B) By replacing the 4.1 g. of 10-[3-(benzylmethylamino)propyl] - 8-chloro-10,11-dihydrodibenzo[b,f][1,4] thiazepine in Example 2(B) with 4.25 g. of the product from (A) above, there is obtained first [(11,12-dihydro-6H - dibenzo[b,f][1,4]thiazocin - 12-yl)propyl]methylcarbamic acid, benzyl ester, and this latter product, treated with 15 ml. of a 30% solution of hydrobromic acid in glacial acetic acid gives 11,12-dihydro-12-(3-methylaminopropyl)-6H-dibenzo[b,f][1,4]thiazocine, dihydrobromide. The dihydrobromide treated in the conventional manner with aqueous sodium hydroxide gives the base which can be isolated via ether extraction; it distills at 146–148° (0.15 mm.).

The base, in isopropanol solution, treated with an isopropanol solution of maleic acid gives 11,12-dihydro-12-(3 - methylaminopropyl) - 6H-dibenzo[b,f][1,4] thiazocine, salt with one mole of maleic acid, M.P. 145–146°.

EXAMPLE 7

*Preparation of 5-(3-methylaminopropyl)-5,6,11,12-tetrahydro-dibenz[b,f]azocine, salt with 2 moles of oxalic acid*

(A) By replacing the 13.0 g. of 8-chloro-10,11-dihydrodibenzo[b,f][1,4]thiazepine in Example 2(A) with 13.5 g. of 5,6,11,12-tetrahydrodibenz[b,f]azocine, there is obtained 5-[3-(benzylmethylamino)propyl]-5,6,11,12-tetrahydrodibenz[b,f]azocine.

(B) By replacing the 4.1 g. of 10-[3-(benzylmethylamino)propyl] - 8-chloro-10,11-dihydro[b,f][1,4]thiazepine in Example 2(B) with 4.2 g. of the product from (A) above, there is obtained first, [(5,6,11,12-tetrahydrodibenz[b,f]azocin-5-yl)propyl]methylcarbamic acid, benzyl ester. The latter, treated with 15 ml. of a 30% solution of hydrobromic acid in glacial acetic acid gives 3-methylaminopropyl - 5,6,11,12-tetrahydrodibenz[b,f]azocine dihydrobromide.

The dihydrobromide is dissolved in water and the solution treated with 10 ml. of 20% aqueous sodium hydroxide giving the base as a viscous oil. This is isolated by ether extraction. The dried and clarified ether solution treated with an ethanolic solution of oxalic acid gives 5-(3 - methylaminopropyl) - 5,6,11,12-dibenz[b,f]azocine, salt with 2 moles of oxalic acid, M.P. 150–151°.

EXAMPLE 8

*Preparation of 2-methoxy-10-(3-methylamino-2-methylpropyl)phenothiazine, hydrobromide*

(A) *Preparation of N-(3-chloro-2-methylpropyl)-N-methylbenzylamine.*—By replacing the 37.1 g. of 3-chloropropionyl chloride in Example 1(A) with 41.3 g. of 3-chloro-isobutyryl chloride, there is obtained N-(3-chloro-2-methylpropyl)-N-methylbenzylamine.

(B) By replacing the 13.0 g. of 8-chloro-10,11-dihydrodibenz[b,f][1,4]thiazepine in Example 2(A) with 12.7 g. of 2-methoxyphenothiazine and the 12.8 g. of N-(3-chloropropyl)-N-methylbenzylamine by 13.1 g. of the product from (A) above, there is obtained 10-(3-benzylmethylamino-2-methylpropyl)-2-methoxyphenothiazine.

(C) By replacing the 4.1 g. of 10-[3-(benzymethylamino)propyl] - 8 - chloro-10,11-dihydrodibenzo[b,f] [1,4]thiazepine in Example 2(B) with 4.8 g. of the product from (B) above, there is obtained first [(2-methoxyphenothiazin - 10-yl) - 2-methylpropyl]methylcarbamic acid, benzyl ester, and this latter product with 15 ml. of a 30% solution of hydrobromic acid in glacial acetic acid gives 2 - methoxy - 10-(3-methylamino-2-methylpropyl) phenothiazine, hydrobromide, as a racemic mixture.

The racemic hydrobromide by conventional treatment with alkali gives the racemic base; the base with d-10-camphorsulfonic acid gives a mixture of isomeric salt which by fractional crystallization are separated into the D- and L-isomeric salts. Each isomer can then be treated with aqueous sodium hydroxide to give the pure D- and L-isomeric bases.

EXAMPLE 9

*Preparation of 10-(3-methylaminopropyl)-1-azaphenothiazine, dihydrobromide*

(A) By replacing the 13.0 g. of 8-chloro-10,11-dihydrodibenzo[b,f][1,4]thiazepine in Example 2(A) with 12.0 g. of 1-azaphenothiazine, there is obtained 10-(3-benzylmethylaminopropyl)-1-azaphenothiazine.

(B) By replacing the 4.1 g. of 10-[3-(benzylmethylamino)propyl] - 8 - chloro - 10,11-dihydrodibenzo[b,f] [1,4]thiazepine in Example 2(B) with 3.95 g. of the product from (A) above there is obtained first, [(1-azaphenothiazin-10-yl)propyl]methylcarbamic acid, benzyl ester. The latter product with a solution of hydrobromic acid in glacial acetic acid gives 10-(3-methylaminopropyl)-1-azaphenothiazine, dihydrobromide.

EXAMPLE 10

*Preparation of 2,3-dihydro-5-(2-methylaminoethyl)-2-phenyl-1,5-benzothiazepin-4(5H)one, hydrobromide*

(A) By replacing the 13.0 g. of 8-chloro-10,11-dihydrodibenzo[b,f][1,4]thiazepine in Example 2(A) with 15.2 g. of 2,3-dihydro-2-phenyl-1,5-benzothiazepin-4(5H)-one and the 12.8 g. of N-(3-chloropropyl)-N-methylbenzylamine with 14.3 g. of N-(2-bromoethyl)-N-methylbenzylamine, there is obtained 5-[2-(benzylmethylamino)ethyl] - 2,3-dihydro-2-phenyl-1,5-benzothiazepin-4(5H)one hydrochloride, M.P. 168–170°.

(B) By replacing the 4.1 g. of 10-[3-(benzylmethylamino)propyl] - 8 - chloro - 10,11 - dihydrodibenzo[b,f] [1,4]thiazepine in Example 2(B) with 4.8 g. of the product from (A) above, there is obtained 4.5 g. of 5-{2-carboxy(methyl)amino]ethyl}-2,3-dihydro - 2 - phenyl-1,5-benzothiazepin-4(5H)-one, M.P. 97–98°.

(C) The product from (B) above, 3.5 g., treated with 25 ml. of a 30% solution of hydrobromic acid in glacial acetic acid as in Example 2(D) gives 4.5 g. of 2,3-dihydro - 5 - (2 - methylaminoethyl)-2-phenyl-1,5-benzothiazepin-4(5H)-one, hydrobromide, M.P. 190–192° (dec.).

EXAMPLE 11

*Preparation of 5-(3-methylaminopropyl)-10,11-dihydro-5H-dibenz[b,f]azepine, hydrochloride*

(A) By replacing the 13.0 g. of 8-chloro-10,11-dihydrodibenzo[b,f][1,4]thiazepine in Example 2(A) with 10.3 g. of 10,11-dihydro-5H-dibenz[b,f]azepine and following the procedure described, there is obtained 12.5 g. of 5 - [3 - (benzylmethylamino)propyl]-10,11-dihydro-5H[b,f]azepine.

(B) Following the procedure in Example 2(B), but replacing the 4.1 g. of 10-[3-(benzylmethylamino)propyl] - 8-chloro-10,11-dihydrodibenzo[b,f][1,4]thiazepine with 3.6 g. of 5-[3-(benzylmethylamino)propyl]-10,11-dihydro-5H-dibenz[b,f]azepine, there is obtained 3.6 g. of [(10,11 - dihydro - 5H - dibenz[b,f]azepin-5-yl)propyl]methylcarbamic acid, benzyl ester as a viscous oil. Continuing to follow the procedure in Example 2(B) but using in place of the 3.0 g. of [(8-chloro-10,11-dihydrodibenzo[b,f][1,4]thiazepin - 10-yl)propyl]methylcarbamic acid benzyl ester, 3.6 g. of [(10,11-dihydro-5H-dibenz[b,f]azepin - 5 - yl)propyl]methylcarbamic acid, benzyl ester, there is obtained 5-(3-methylaminopropyl)-10,11-dihydro-5H-dibenz[b,f]azepine dihydrobromide. The dihydrobromide is stirred in a mixture of 50 ml. of 5% aqueous sodium bicarbonate solution and 50 ml. of ether, the ether phase separated, dried, filtered and treated while cooling and stirring with a slight excess of ethereal hydrogen chloride. The resulting 5-(3-methylaminopropyl)-10,11-dihydro-5H-dibenz[b,f]azepine, hydrochloride has a M.P. of 212–213° after recrystallization and weighs 1.2 g.

(C) By replacing the 4.1 g. of 10-[3-(benzylmethylamino)propyl] - 8 - chloro - 10,11 - dihydrodibenzo[b,f][1,4]thiazepine in Example 2(B) with 3.6 g. of 5-[3-(benzylmethylamino)propyl] - 10,11-dihydro-5H-dibenz[b,f]azepine and the 2.6 g. of benzyl chloroformate with 2.2 g. of ethyl chloroformate and continuing the work up as described in Example 11(B) there is obtained 2.1 g. of 5-(3-methylaminopropyl)-10,11-dihydro-5H-dibenz[b,f]azepine, hydrochloride, identical with that obtained in (B) above.

EXAMPLE 12

*Preparation of 3-(10,11-dihydro-5H-dibenzo[a,d]cyclohepten - 5 - ylidene) - N - methyl propylamine, hydrobromide*

(A) To a vigorously stirred suspension of 7.2 g. of magnesium in 150 ml. of anhydrous ether is added 1 ml. of ethyl bromide and a crystal of iodine. When the reaction starts, a solution of 55 g. of N-(3-chloropropyl)-N-methylbenzylamine in 150 ml. of ether is added while heating under reflux. A solution of 21 g. of 10,11-dihydro-5H-dibenzo[a,d]cycloheptene-5-one in 150 ml. of ether is then added and the reaction mixture is worked up to give 18.5 g. of 5-hydroxy-5-[3-(benzylmethylamino)propyl]-10,11-dihydro-5H-dibenzo[a,d]cycloheptene. A mixture of 18.5 g. of the 5-hydroxy compound, 50 ml. of concentrated hydrochloric acid, and 150 ml. of glacial acetic acid is heated under reflux to give 14.2 g. of N-[3-(10,11 - dihydro-5H-dibenzo[a,d]cyclohepten-5-ylidene)propyl]-N-methylbenzylamine.

(B) By substituting for the 4.1 g. of 10-[3-(benzylmethylamino)propyl] - 8 - chloro-10,11-dihydrodibenzo[b,f][1,4]thiazepine in Example 2(B), 3.6 g. of N-[3-(10,11 - dihydro - 5H-dibenzo[a,d]cyclohepten-5-ylidene)propyl]-N-methylbenzylamine there is obtained 1.1 g. of 3 - (10,11 - dihydro - 5H - dibenzo[a,d]cyclohepten - 5-ylidene)-N-methylpropylamine, hydrobromide.

(C) By replacing the 4.1 g. of 10-[3-(benzylmethylamino)propyl] - 8-chloro-10,11-dihydrodibenzo[b,f][1,4]thiazepine in Example 2(B) with 3.6 g. of N-[3-(10,11-dihydro - 5H-dibenzo[a,d]cyclohepten-5-ylidene)propyl]-N-methylbenzylamine and the 2.6 g. of benzyl chloroformate with 2.2 g. of ethyl chloroformate, there is obtained 2.3 g. of 3-(10,11-dihydro-5H-dibenzo[a,d]cyclohepten-5-ylidene)-N-methyl propylamine, hydrobromide.

What is claimed is:

1. A method for introducing an N-monosubstituted aminoalkylene side chain into the nucleus of a polycyclic nuclear compound which comprises reacting a polycyclic nuclear compound selected from the group consisting of phenothiazine and dibenzothiazepine in an inert organic solvent at a temperature up to about reflux with an aminoalkyl halide of the formula

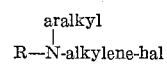

wherein

R is a member of the group consisting of aryl, aralkyl and alkyl, and hal is a halogen, reacting the product with a haloformate in an inert organic solvent at a temperature up to about reflux thereby producing the carbamic acid ester and removing the ester group by reaction with a hydrogen halide under mild conditions.

2. A method for introducing an N-monosubstituted aminoalkylene side chain into the nitrogen atom of a phenothiazine which comprises reacting the phenothiazine in an inert organic solvent at a temperature up to about reflux with an aminoalkyl halide of the formula

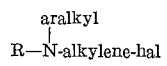

wherein

R is a member of the group consisting of aryl, aralkyl and alkyl, and hal is a halogen, reacting the product with a chloroformate ester in an inert organic solvent at a temperature up to about reflux thereby producing the carbamic acid ester and removing the ester group by reaction with hydrogen bromide under mild conditions.

3. A method for producing an N-monosubstituted aminoalkylene derivative of a polycyclic nuclear compound which comprises reacting in an inert organic solvent at a temperature up to reflux temperature a polycyclic nuclear compound selected from the group consisting of phenothiazine and dibenzothiazepines bearing the side chain

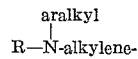

wherein

R is a member of the group consisting of aryl, aralkyl and alkyl, with a chloroformate thereby producing the carbamic acid ester and removing the ester group by reaction with a substantially anhydrous hydrogen halide under mild conditions.

4. A method for introducing a lower alkylamino lower alkylene side chain onto the nitrogen atom of a phenothiazine which comprises reacting an N-[alkylene-N'-(aralkyl)]phenothiazine with a member of the group consisting of phenyl-lower alkyl-chloroformate and lower alkyl-chloroformate in an inert organic hydrocarbon solvent at a temperature up to about reflux thereby producing the carbamic acid ester and removing the ester group by reaction with substantially anhydrous hydrogen bromide at about room temperature.

5. A method for the production of 10-(3-methylamino propyl)2-(trifluoromethyl)phenothiazine which comprises refluxing 10-[3-(benzylmethylamino)propyl]-2-(trifluoromethyl)phenothiazine with benzylchloroformate in an inert organic hydrocarbon solvent, then reacting the reaction product with concentrated hydrobromic acid in glacial acetic acid at about room temperature.

References Cited by the Examiner

UNITED STATES PATENTS 2,921,069    1/1960    Ullyot _____ 260—243

OTHER REFERENCES

Ben-Ishai et al.: J. Org. Chem., vol. 17, pp. 1564–1569 (1952).

Flyn et al.: J. Am. Chem. Soc., vol. 77, pp. 3104–3106 (1955).

Houben-Weyl: Methoden der Organischen Chemie (4th edition), vol. 11/1, pp. 985–988 (1957).

Knabe et al.: Arch. Pharm., vol. 289, pp. 479–488 (1956).

Schmalz et al.: J. Am. Chem. Soc., vol. 76, pp. 5455–5459 (1954).

Wright et al.: J. Am. Chem. Soc., vol. 72, pp. 3536–3539 (1950).

Wright et al.: J. Org. Chem., vol. 26, pp. 4057–4060 (October 1961).

JOHN D. RANDOLPH, *Acting Primary Examiner.*